(12) United States Patent
West

(10) Patent No.: US 7,882,948 B2
(45) Date of Patent: Feb. 8, 2011

(54) U-CLIP ASSEMBLY AND METHOD

(76) Inventor: Robert J. West, 752 Hallowell Rd., Pownal, ME (US) 04069

( * ) Notice: Subject to any disclaimer, the term of this patent is extended or adjusted under 35 U.S.C. 154(b) by 311 days.

(21) Appl. No.: 12/229,529

(22) Filed: Aug. 25, 2008

(65) Prior Publication Data
US 2009/0223026 A1 Sep. 10, 2009

Related U.S. Application Data

(60) Provisional application No. 61/068,280, filed on Mar. 7, 2008.

(51) Int. Cl.
*B65D 69/00* (2006.01)
*F16B 15/00* (2006.01)
(52) U.S. Cl. .................. 206/340; 206/346; 206/338
(58) Field of Classification Search .................. 206/340, 206/346, 345, 338, 343, 344, 347, 820, 390; 24/23 W, 20 CW, 20 W, 336, 339
See application file for complete search history.

(56) References Cited

U.S. PATENT DOCUMENTS

| | | | | |
|---|---|---|---|---|
| 3,613,878 A | * | 10/1971 | Langas et al. | 206/340 |
| 3,722,670 A | * | 3/1973 | Plunkett | 206/340 |
| 4,508,220 A | * | 4/1985 | Pearson | 206/343 |
| 5,303,821 A | * | 4/1994 | Ayres | 206/346 |
| 5,314,064 A | * | 5/1994 | Wells et al. | 206/340 |
| 5,314,065 A | * | 5/1994 | Ayres et al. | 206/340 |
| 5,564,564 A | * | 10/1996 | Poffenberger | 206/340 |
| 5,682,994 A | * | 11/1997 | Poffenberger | 206/340 |
| 5,833,064 A | * | 11/1998 | Ayres et al. | 206/340 |
| 5,878,880 A | * | 3/1999 | Poffenberger | 206/340 |
| 5,927,491 A | * | 7/1999 | Room et al. | 206/340 |
| 6,357,588 B1 | * | 3/2002 | Room et al. | 206/346 |

\* cited by examiner

*Primary Examiner*—Steven Reynolds
(74) *Attorney, Agent, or Firm*—William Nitkin

(57) ABSTRACT

A structure and method for forming a U-clip assembly made of a plurality of U-clips arrayed in a continuous abutting relation, each U-clip having first and second slots defined in its crown portion with first and second soft metal wires positioned, respectively, in such first and second slots, such soft metal wire forming a shallow U shape between adjacent crown portions, such first and second soft metal wires being compressed within their slots to expand within such slots for contacting and urging against the sides and bottom of each slot and being retained therein, such soft metal wire and its shallow U shape between adjacent crown portions allowing the U-clip assembly to maintain a non-curved shape and to be substantially flat in configuration.

5 Claims, 2 Drawing Sheets

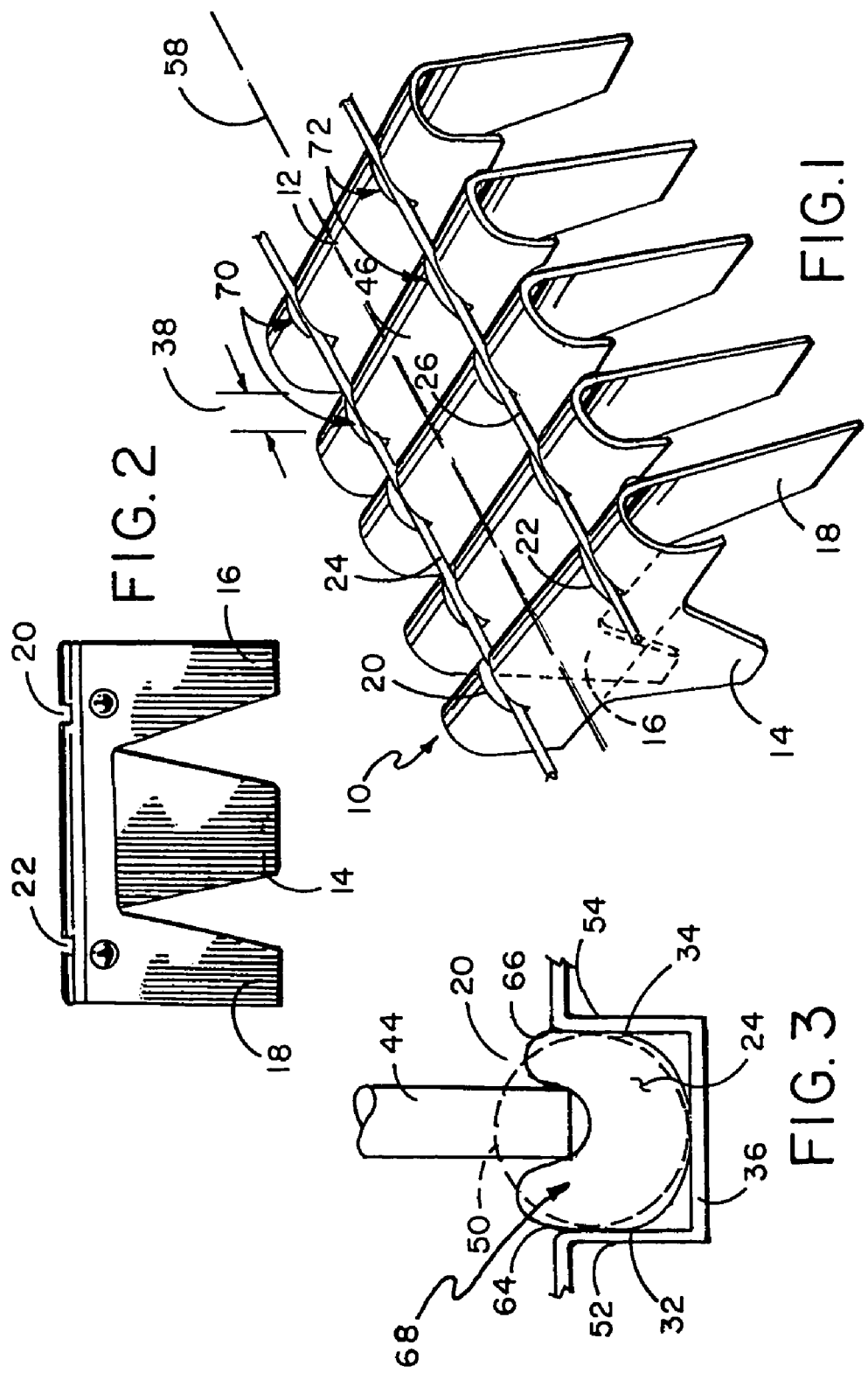

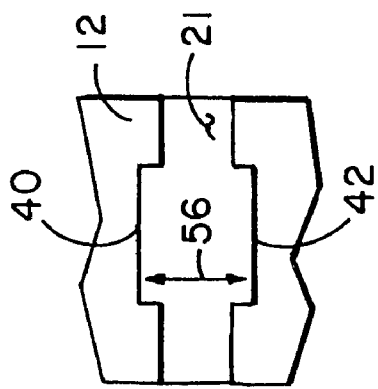
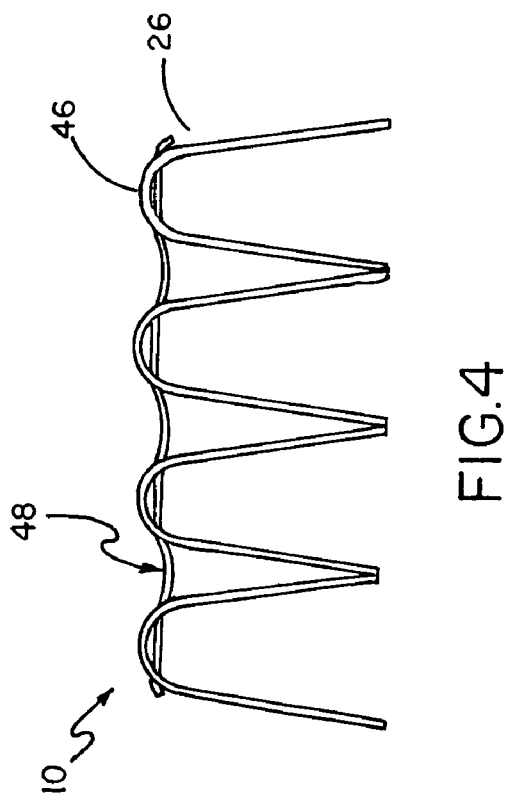
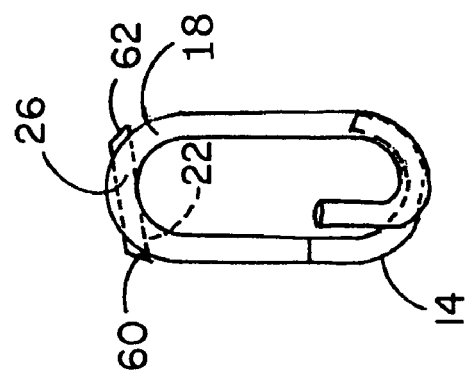

U-CLIP ASSEMBLY AND METHOD

This application claims priority and benefit of a provisional patent application entitled U-Clip Assembly and Method, Ser. No. 61/068,280 filed Mar. 7, 2008.

BACKGROUND OF THE INVENTION

1. Field of the Invention

The present invention relates to a U-clip assembly for insertion into an application tool and more particularly relates to a U-clip assembly comprised of a plurality of U-clips, each having a pair of slots defined in the crown of each, which clips are aligned in a row with soft metal wire positioned in the slots for retaining the U-clips in such row.

2. Description of the Prior Art

U-clips or clips have long been used in the prior art for the assembly and retention of pairs of wires. There is a body of this art which relates to furniture, spring retention and retention of wires in automobile seats and another body of art where the U-clips are somewhat different for the retention of wires in traps, such as lobster traps. The term "U-clip" and "clip" are used interchangeably herein. When U-clips are used in furniture, they are frequently made of a steel material where the legs of the U-clips are substantially parallel and are installed around pairs of wires to retain them together as part of the furniture assembly process. When U-clips or clips are utilized in traps, they are usually disposed around plastic-covered wire; and the legs of the clips are not parallel but are spread apart at their bottoms. Further such U-clips are frequently made of an aluminum-type material rather than steel so as not to rust when placed in water and have less chance of creating an electrolysis or electrical-type reaction with the wire of the trap should the plastic covering thereof be cut through.

U-clips have been held in rows or stacks by having a pair of plastic cords engage into a pair of slots in their tops, such as taught by Ayres, U.S. Pat. No. 5,303,821. When the U-clips are aligned, the slots are aligned in two parallel rows into which slots the plastic cord is placed, and the sides of each U-clip are compressed inwards so as to compress the sides of the slots against the plastic cord, thereby retaining the clips in alignment on the plastic cord until they are placed in the tool that applies them to be individually broken off from the rest of the row of clips upon installation.

In Poffenberger, U.S. Pat. No. 5,564,564 each slot in the top of the clip is formed so that its plastic cord can be engaged and held in place by having a tab on the clip bent over the slot to engage the tab on top of the plastic cord so as to hold the clip in place until it is installed.

Another means of retaining a plastic cord in position in slots in the clips is to provide the slots with projections on the top thereof that extend inward, allowing the cord to be forced into each slot and below the projections on each side thereof and then be held in place by such projections, such as taught by Room et al., U.S. Pat. No. 6,357,588.

A further type of retention system in clip assemblies is taught in Room et al., U.S. Pat. No. 5,927,491 which has tongues that are pushed downward over the plastic cords to hold them in place until the clip is installed.

A more complex clip assembly is found in Ayres et al., U.S. Pat. No. 5,314,065 which teaches a plurality of slots in the top sides of the clips which are deformed to hold the plastic cords that are passed therethrough.

In prior art clips made by Stanley Tools the plastic cord is passed through slots that are formed without apparent outside compression, covers or deformations. The plastic cords are held in place merely by the force of compression of the plastic cord against the sides of each slot. The plastic cord, being somewhat larger than the slot and resilient, is then compressed on insertion and urges outward against the sides of the slot to hold the clips in alignment in the row for installation.

In other prior art some metal clip assemblies are held by an adhesive tape running across the top crowns of the clips thereof, but this method of clip retention can have a disadvantage in that there can be a residual adhesive buildup which can gum up the application tool. Thus the use of adhesive tape, as discussed herein, is not the most desirable method of holding a plurality of clips.

SUMMARY OF THE INVENTION

It is an object of this invention to provide a new structure and method for forming a U-clip assembly utilizing soft metal wire to join wires used in fishing traps wherein the clips are the typical type having two lateral legs on one side with a medial leg on the other side joined by a crown portion and having a pair of parallel slots, being first and second slots defined in the crown portion of each U-clip. A plurality of U-clips, when aligned, have their respective first and second slots aligned along a longitudinal axis with one another so that first and second soft metal wires, such as soft aluminum wire, can be inserted in each aligned first slot and a second soft metal wire can be inserted in each aligned second slot, respectively, and both compressed on the tops of each wire, causing the first and second soft metal wires to be deformed and urged outward against the sides of their respective slots in which they are positioned. In a preferred embodiment the soft metal wire can be a 1350 alloy or 1100 alloy of 99%-99.5% pure aluminum in a 0 temper state. The use of such soft metal wire is critical to the present invention. The diameter of the soft metal wire can be the same or slightly wider than the diameter of the slots. The use of a soft metal wire also has an advantage when these clips are used in the bedding industry where heating can sometimes be necessary for tempering. A plastic cord, such as nylon, might melt as it has a far lower melting temperature than metal wire. Soft metal wire, when compressed from the top into a slot, expands against the sides of the slot and is forced tightly therein as the sides of the soft metal wire are pushed outward, contacting not only on the bottom of the slot, but also urging against its sides as well. Further, since such soft metal wire is not resilient as is the plastic cord of the prior art, it stays in its compressed, expanded position within the slot.

It is a further object of this invention to provide a clip assembly that is compatible with the requirements of the fishing industry. Soft metal wire can be chosen of a type compatible with preventing electrolysis when the clips are used in the fishing industry. The clips used in the fishing industry have legs that spread outward at their bottoms to be more easily passed around plastic-covered wires, and such legs also are tapered inwards at their ends so as not to dig into the plastic covering of the wires when clinched therearound. The legs of the clip, being spread outwards at the bottom, cause the row of the crown portion of each clip to be spaced further apart from one another at their tops than the crowns of parallel-legged clips. It has been found that using a soft metal wire and forcing an extra length of wire between adjacent crown portions of the clip assembly, such extra length being longer than the straight distance between adjacent crown portions, causes the crown portions not to pull toward one another and allows the row of clips to form a flat strip rather than a curved strip. The use of a soft metal wire to retain the clips together has been found advantageous for use in the fishing industry as they do not break primarily at one side of the clip and thus do not leave a sharp piece of plastic protruding from the other side as occurs using the plastic cords of the prior art. Such sharp plastic cord protrusions may not be important in furniture assembly as the clips are used internally. However, since lobster traps must be handled frequently, any sharp plastic protrusions can be painful if forced against the hand or arm and can hurt lobstermen who frequently come in contact with such clips. By using the soft metal wire in the U-clip assembly of this invention, the soft metal wire joining the clips when the clip is applied can be easily pinched off close on both sides of the clip, and the applied clips will then have a generally smooth exterior.

It is a still further object of this invention to provide a clip assembly utilizing soft metal wire, when applied, yields clips which grip more consistently and reliably than clip assemblies utilizing prior art plastic cords. In some embodiments of the present invention the middle section of each slot can be made a little bit wider than the rest of the slot which feature makes insertion of the soft metal wire a little easier and more reliable. Also, in some embodiments of the present invention the tops of the slot sides can be rounded on a radius to make insertion of the soft metal wire in each slot easier.

BRIEF DESCRIPTION OF THE DRAWINGS

FIG. 1 illustrates a rear perspective view of a plurality of U-clips held in alignment by soft metal wire.

FIG. 2 illustrates a front elevational view of one of the clips.

FIG. 3 illustrates an enlarged sectional front view of a slot, showing the soft metal wire of this invention being installed therein.

FIG. 4 illustrates a side view of a plurality of U-clips, showing the soft metal wire being disposed in a shallow U shape between adjacent crown portions.

FIG. 5 illustrates an enlarged top view of the embodiment of a slot having a wider center area for receipt of a soft metal wire therein.

FIG. 6 illustrates an enlarged side view of an applied clip of this invention, showing the slight protrusions of remaining soft metal wires extending therefrom.

DESCRIPTION OF THE PREFERRED EMBODIMENT(S)

FIG. 1 illustrates a rear perspective view of a plurality of U-clips 12, forming a U-clip assembly 10 which is held together by a first and second soft metal wires 24 and 26 which are disposed, respectively, within first slot 20 and second slot 22 which slots are defined in the tops of each U-clip 12. Each U-clip 12 also referred to as clip 12 has first and second transversely spaced legs 16 and 18 in the front and a medial leg 14 in the rear. The front legs and rear leg are spaced apart from one another at an angle, spreading apart at the bottoms thereof so that crown portion 46 of each clip in a row of clips is spaced apart a distance 38 from the crown portion of the adjacent clip. First and second soft metal wires 24 and 26 are shown disposed, respectively, within first and second slots 20 and 22 of each clip, such slots also seen in the front view of clip 12 of FIG. 2. First slot 20 and second slot 22 each has a base 36. The collated assembly of clips, as seen in FIG. 1, are formed in a strip positioned along central longitudinal axis 58 in continuous abutting relation, each clip being disposed such that its crown portion 46 traverses longitudinal axis 58 with each crown portion 46 having first and second slots 20 and 22 defined therein with each slot laterally displaced from longitudinal axis 58 by an equal distance with first and second slots each having a slot opening, such as slot opening 68 seen in FIG. 3. The slot openings are arranged to be in alignment with their respective slot opening in the plurality of clips of the clip assembly. The slot openings are aligned in parallel rows with similar openings in adjacent clips with the pairs of openings in the strip of clips being aligned to form two elongate troughs, being first trough 70 and second trough 72 where the clip assembly is held together by first and second soft metal wires 24 and 26 which are securely and mechanically held in each slot by the compression and resulting expansion of the soft metal wire therein. The slots are colinearly aligned to permit the soft metal wire to be inserted in the slots and troughs formed therefrom with such troughs extending the length of the strip of aligned clips.

FIG. 3 illustrates an enlarged sectional front view of first slot 20 having bottom 36 and first and second sides 52 and 54 which are substantially perpendicular to bottom 36 and parallel to one another. First soft metal wire 24 is shown in its original form which is generally circular and is designated by dashed lines 50. When soft metal wire 24 is pushed downward into slot 20 by press 44, soft metal wire 24 is forced outwards at first and second contacts 32 and 34 to urge tightly against first and second sides 52 and 54 and bottom 36 of first slot 20 so as to be retained securely therein. Further, first and second top edges 64 and 66, respectively, of first and second sides 52 and 54 of first slot 20 can be rounded on a radius to allow for easier insertion of soft metal wire 24 into first slot 20.

FIG. 4 illustrates a side view of clip assembly 10 of this invention wherein a plurality of clips 12 are positioned with length 48 of soft metal wire defined between adjacent crown portions each clip and showing length 48 of soft metal wire 26 formed in a shallow U shape between adjacent crown portions 46, making length 48 longer than the distance 38 between adjacent crown portions 46.

FIG. 5 illustrates a top view of an alternate embodiment of a slot wherein clip slot 21 has an inner section in the center thereof, which center portion has a wider wire receipt slot area 56 having first and second sides 40 and 42 disposed parallel to one another. Such wider wire receipt slot area 56 allows for easier insertion of the soft metal wire in clip slot 21 when installed by a press, such as press 44, as seen in FIG. 3, or by equivalent means.

FIG. 6 illustrates an enlarged side view of the clip of this invention that has been applied, for example around wires, which wires are not illustrated in this view. FIG. 6 illustrates soft metal wire 26 extending through second slot 22 wherein any excess wire is clipped off by the step of clinching the U-clip around the wires, leaving the very small first and second protrusions 60 and 62 extending slightly beyond the ends of second slot 22 which minimize the likelihood of a user's hand being scratched during handling of traps on which such clip has been installed.

Although the present invention has been described with reference to particular embodiments, it will be apparent to those skilled in the art that variations and modifications can be substituted therefor without departing from the principles and spirit of the invention.

I claim:

1. A method for forming a U-clip assembly for use in a U-clip applicator, comprising the steps of:

providing a plurality of U-clips arranged in a continuous, aligned, abutting relationship forming a strip having a longitudinal axis, each of said U-clips for clinching around objects to be joined together, each of said clips having a crown portion having a top, a bottom, first and second sides, first and second lateral legs spaced apart from one another on said bottom of said crown portion on said first side thereof extending downwardly from said first side of said crown portion, and on said second side of said bottom of said crown portion having a medial leg extending downwardly therefrom, each of said crown portions of said plurality of U-clips having first and second slots defined in said crown portion aligned parallel to said longitudinal axis and to one another, said first and second slots being generally U-shaped in configuration and aligned in two parallel rows equidistant from said longitudinal axis and forming first and second troughs, each of said slots having a bottom and first and second sides, the distance between said first and second sides of each slot defining the width of said slot: the distance between said adjacent crown portions defining a linear distance therebetween;

positioning first and second soft metal wires, respectively, in said first and second troughs of aligned slots;

compressing said first and second soft metal wires, respectively, in said first and second slots of said plurality of U-clips;

expanding outwardly said first and second soft metal wires by said step of compressing and urging said first and second soft metal wires tightly against said first and second sides and bottoms, respectively, of said first and second slots;

retaining said plurality of U-clips in alignment by said outward expansion of said first and second soft metal wires, respectively, in said first and second slots;

further including the steps of:

providing each of said first and second soft metal wires between said adjacent crown portions to be of a length greater than said linear distance between said adjacent crown portions, said wire between adjacent crown portions forming a shallow U shape; and preventing any tendency of said adjacent crown portions to pull toward one another by said greater lengths of said first and second soft metal wires disposed between adjacent crown portions of said U-clips.

2. A method for forming a U-clip assembly for use in a U-clip applicator, comprising the steps of:

providing a plurality of U-clips arranged in a continuous, aligned, abutting relationship forming a strip having a longitudinal axis, each of said U-clips for clinching around objects to be joined together, each of said clips having a crown portion having a top, a bottom, first and second sides, first and second lateral legs spaced apart from one another on said bottom of said crown portion on said first side thereof extending downwardly from said first side of said crown portion, and on said second side of said bottom of said crown portion having a medial leg extending downwardly therefrom, each of said crown portions of said plurality of U-clips having first and second slots defined in said crown portion aligned parallel to said longitudinal axis and to one another, said first and second slots being generally U-shaped in configuration and aligned in two parallel rows equidistant from said longitudinal axis and forming first and second troughs, each of said slots having a bottom and first and second sides, the distance between said first and second sides of each slot defining the width of said slot; the distance between said adjacent crown portions defining a linear distance therebetween;

positioning first and second soft metal wires, respectively, in said first and second troughs of aligned slots;

compressing said first and second soft metal wires, respectively, in said first and second slots of said plurality of U-clips;

expanding outwardly said first and second soft metal wires by said step of compressing and urging said first and second soft metal wires tightly against said first and second sides and bottoms, respectively, of said first and second slots;

retaining said plurality of U-clips in alignment by said outward expansion of said first and second soft metal wires, respectively, in said first and second slots;

providing each of said first and second soft metal wires between said adjacent crown portions to be of a length greater than said linear distance between said adjacent crown portions, said wire between adjacent crown portions forming a shallow U shape;

preventing any tendency of said adjacent crown portions to pull toward one another by said greater lengths of said first and second soft metal wires disposed between adjacent crown portions of said U-clips;

providing each of said first and second slots in each of said plurality of U-clips with a portion having a wider width for ease of positioning said first and second soft metal wires within said first and second slots; and further including the step of clipping off any soft metal wire extending beyond said slots during the clinching of said U-clips around said objects joined together.

3. A U-clip assembly comprising:

a plurality of U-clips arranged in a continuous, aligned, abutting relationship forming a strip having a longitudinal axis, each of said clips having a crown portion having a top, a bottom, first and second sides, first and second lateral legs spaced apart from one another on said bottom of said crown portion on said first side thereof extending downwardly from said first side of said crown portion, and on said second side of said bottom of said crown portion having a medial leg extending downwardly therefrom, each of said crown portions of said plurality of U-clips having first and second slots defined in said crown portion aligned parallel to said longitudinal axis and to one another, said first and second slots having a central portion and being generally U-shaped in configuration and aligned in two parallel rows equidistant from said longitudinal axis and forming first and second troughs, each of said slots having a bottom and first and second sides, the distance between said first and second sides of each slot defining the width of said slot; the distance between said adjacent crown portions defining a linear distance therebetween;

first and second soft metal wires, each of said soft metal wires for positioning, respectively, within said aligned first and second slots, each of said first and second soft metal wires being compressed to a point where said first and second soft metal wires are forced, respectively, against said first and second sides and bottoms of said first and second slots and retained therein by said compressed first and second soft metal wires urging against said first and second sides and bottoms, respectively, of said first and second slots; and wherein the length of said soft metal wire disposed between adjacent crown portions of adjacent U-clips is longer than said linear distance between said adjacent crown portions, said soft metal wire forming a shallow U shape between said adjacent crown portions for allowing said U-clip assembly to maintain a non-curved shape and to be substantially flat in configuration.

4. The U-clip assembly of claim 3 wherein each of said slots is formed having a wider width defined in said central portion thereof for providing easy, non-contacting insertion of said soft metal wire therein.

5. The U-clip assembly of claim 3 wherein said soft metal wire is comprised of 99%-99.5% pure aluminum.

* * * * *